(12) United States Patent
Ragot et al.

(10) Patent No.: US 11,945,294 B2
(45) Date of Patent: Apr. 2, 2024

(54) MODULAR BATTERY PACK FOR MOUNTING TO A VEHICLE FRAME

(71) Applicant: VOLVO TRUCK CORPORATION, Gothenburg (SE)

(72) Inventors: Sébastien Ragot, Gothenburg (SE); Jonatan Hörder, Mölndal (SE); Sondre Landvik, Gothenburg (SE); Mikael Boisen, Gothenburg (SE); Gustav Andersson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 368 days.

(21) Appl. No.: 17/594,268

(22) PCT Filed: Apr. 11, 2019

(86) PCT No.: PCT/EP2019/059323
§ 371 (c)(1),
(2) Date: Oct. 8, 2021

(87) PCT Pub. No.: WO2020/207591
PCT Pub. Date: Oct. 15, 2020

(65) Prior Publication Data
US 2022/0161648 A1    May 26, 2022

(51) Int. Cl.
*B60K 1/04*      (2019.01)
*H01M 10/42*    (2006.01)
*H01M 50/258*   (2021.01)

(52) U.S. Cl.
CPC ............ *B60K 1/04* (2013.01); *H01M 10/4257* (2013.01); *B60K 2001/0405* (2013.01); *H01M 50/258* (2021.01); *H01M 2220/20* (2013.01)

(58) Field of Classification Search
CPC ............ B60K 1/04; B60K 2001/0405; H01M 10/4257; H01M 50/258; H01M 2220/20
See application file for complete search history.

(56) References Cited

U.S. PATENT DOCUMENTS

| | | | |
|---|---|---|---|
| 8,734,975 B2 * | 5/2014 | Burrows | H01M 10/6556 429/88 |
| 2006/0024566 A1 * | 2/2006 | Plummer | H01M 50/204 180/68.5 |

(Continued)

FOREIGN PATENT DOCUMENTS

| | | |
|---|---|---|
| CN | 203442434 U | 2/2014 |
| CN | 104953056 A | 9/2015 |

(Continued)

OTHER PUBLICATIONS

International Search Report and Written Opinion dated Dec. 12, 2019 in corresponding International PCT Application No. PCT/EP2019/059323, 10 pages.

(Continued)

*Primary Examiner* — Erez Gurari
(74) *Attorney, Agent, or Firm* — Venable LLP; Jeffri A. Kaminski

(57) ABSTRACT

A modular battery pack for mounting to a vehicle frame of a vehicle. The modular battery pack comprising a plurality of modules arranged adjacent to each other, wherein at least one module constitutes an electrical energy storage module. Each module comprises first and second opposite side walls arranged to face respective side walls of adjacent modules, and to provide structural integrity of the modular battery pack. Each side wall comprises a common set of interfaces for interfacing between adjacent modules. The modular battery pack also comprising at least one control unit having a side wall comprising the common set of interfaces, and also a vehicle interface for interfacing with the vehicle.

17 Claims, 4 Drawing Sheets

(56) References Cited

U.S. PATENT DOCUMENTS

| | | | |
|---|---|---|---|
| 2007/0087266 A1* | 4/2007 | Bourke | H01M 50/505 |
| | | | 429/61 |
| 2008/0118819 A1* | 5/2008 | Gamboa | H01M 50/258 |
| | | | 429/61 |
| 2012/0224326 A1* | 9/2012 | Kohlberger | H01M 10/656 |
| | | | 361/689 |
| 2018/0138473 A1* | 5/2018 | Bessho | B60L 50/64 |
| 2018/0248167 A1* | 8/2018 | Hashizawa | H01M 10/425 |
| 2018/0358667 A1* | 12/2018 | Harris | B60L 50/64 |
| 2020/0006722 A1* | 1/2020 | Tanner | H01M 10/6556 |
| 2020/0047631 A1* | 2/2020 | Kupfer | B60L 50/64 |
| 2021/0218100 A1* | 7/2021 | Shao | H01M 50/264 |
| 2021/0359369 A1* | 11/2021 | Wu | H01M 50/269 |
| 2021/0380001 A1* | 12/2021 | Hörder | B60L 50/64 |
| 2022/0161648 A1* | 5/2022 | Ragot | B60K 1/04 |
| 2022/0289067 A1* | 9/2022 | Adegbohun | H01M 10/6554 |
| 2023/0076964 A1* | 3/2023 | Dingman | B60L 50/64 |
| 2023/0078192 A1* | 3/2023 | Kita | H01M 50/242 |
| | | | 429/99 |
| 2023/0111535 A1* | 4/2023 | Ali | H01M 50/204 |
| | | | 429/99 |
| 2023/0216110 A1* | 7/2023 | Kim | H01M 50/249 |
| | | | 429/98 |
| 2023/0238634 A1* | 7/2023 | Shin | H01M 50/249 |
| | | | 429/100 |
| 2023/0339307 A1* | 10/2023 | Riegels | H01M 50/244 |

FOREIGN PATENT DOCUMENTS

| | | |
|---|---|---|
| CN | 205050895 U | 2/2016 |
| CN | 205452393 U | 8/2016 |
| CN | 207664153 U | 7/2018 |
| CN | 208515563 U | 2/2019 |
| DE | 102017009176 A1 | 4/2018 |
| DE | 102017200479 A1 | 7/2018 |
| DE | 102017215086 A1 | 2/2019 |
| EP | 3113278 A1 | 1/2017 |
| EP | 3346517 A1 | 7/2018 |

OTHER PUBLICATIONS

International Preliminary Report on Patentability dated Aug. 5, 2020 in corresponding International PCT Application No. PCT/EP2019/059323, 18 pages.

Chinese Office Action dated Jul. 29, 2023 in corresponding Chinese Patent Application No. 201980095234.X, 7 pages.

* cited by examiner

MODULAR BATTERY PACK FOR MOUNTING TO A VEHICLE FRAME

CROSS-REFERENCE TO RELATED APPLICATIONS

This application is a U.S. National Stage application of PCT/EP2019/059323, filed Apr. 11, 2019, and published on Oct. 15, 2020, as WO 2020/207591 A1, all of which is hereby incorporated by reference in its entirety.

TECHNICAL FIELD

The present disclosure relates to electrical power sources for powering vehicles, and to manufacturing of electrically powered vehicles.

The invention can be applied in cargo transport vehicles, such as for providing drive power in towing truck and semi-trailer combinations. Although the invention will be described mainly with respect to a semi-trailer vehicle, the invention is not restricted to this particular vehicle, but may also be used in other vehicles, such as trucks, buses, recreational vehicles and construction equipment.

BACKGROUND

Electrically powered cargo transport vehicles require an electrical energy source, i.e., a battery system, which is capable of delivering the required power and which has sufficient energy capacity. Different types of cargo transport vehicles have different requirements on power and energy capacity of the battery system. Some vehicles targeted at long-haul transport of heavy goods may require a larger battery system compared to smaller vehicles which are used on shorter routes.

Vehicles for cargo transport often differ in terms of, e.g., wheel base dimension, axle configuration, and load capacity. The available space for efficiently mounting battery systems is therefore different between different vehicle types.

To cope with these different requirements, one or several extra battery packs can be mounted on vehicles to increase the energy capacity as needed. However, this causes a significant increase in complexity when it comes to the additional routing of battery interfaces such as power, control, ground, and cooling.

US20120224326 A1 discloses a modular battery structure where the number of modules can be selected based on energy requirements.

The batteries in electrical vehicles, and especially in cargo transport vehicles, are often very large and heavy. Therefore, a secure and efficient way of mounting these battery systems to the vehicle frame is needed. The mounting solution should be production friendly on an assembly line where the time spent on each station is limited.

CN 208515563 U discloses a battery mounting arrangement comprising a bracket having a hook portion onto which a protruding mechanical mounting element of a battery pack is mountable.

There is a need for battery systems which can be adapted to different types of electric vehicles and which is easily assembled on the vehicle during manufacturing.

SUMMARY

It is an object of the present disclosure to provide improved modular battery packs for mounting to vehicle frames. This object is obtained at least in part by a modular battery pack for mounting to a vehicle frame of a vehicle. The battery pack comprises a plurality of modules arranged adjacent to each other, wherein at least one module constitutes an electrical energy storage module. Each module comprises a first and a second side wall arranged mutually opposite each other and facing respective side walls of adjacent modules. The side walls are configured to provide structural integrity of the modular battery pack. Each side wall also comprises a common set of interfaces for interfacing between adjacent modules. The modular battery pack furthermore comprises at least one control unit having a side wall comprising the common set of interfaces. The control unit also comprises a vehicle interface for interfacing with the vehicle.

This way a single control unit may control several modules through the common set of interfaces arranged in the side wall. Regardless of how many modules the control unit controls, the routing complexity and its interfaces remain the same since the control unit is connected to the vehicle via the vehicle interface.

Since the side walls all face each other, the common set of interfaces are enclosed in the modular battery pack. This is an advantage since the interfaces are thereby protected.

The side walls provide structural integrity, which is an advantage. The side walls act as structural elements of the battery pack, which can be aligned with brackets for attaching the modular battery pack to a vehicle frame. The side walls can also contribute to protecting the battery's internal cells in the case of a collision.

According to aspects, the modular battery pack comprises one or more mounting elements for mounting the modular battery pack to the vehicle frame such that the side walls are oriented perpendicular to a driving direction of the vehicle.

By being oriented perpendicular to the driving direction, the side walls provide increased protection of the battery's internal cells in case of a collision.

According to aspects, the modular battery pack comprises at least one intermediary bracket arranged in-between side walls of two adjacent modules to further increase the structural integrity of the modular battery pack.

If the battery pack requires further structural strength, the optional intermediary bracket can be applied between modules. The bracket then acts as both the interface between modules as well as structural support. Thus, the intermediary bracket functions both as interface between modules as well as structural support.

According to aspects, the intermediary bracket comprises a mounting element for mounting the modular battery pack to a vehicle frame such that the side walls are oriented perpendicular to a driving direction of the vehicle.

In this case the intermediary bracket also includes part of a fastening arrangement for mounting the modular battery pack to a vehicle frame. The intermediary bracket thereby provides a robust fastening arrangement, which is an advantage.

According to aspects, the common set of interfaces comprises connections for electrical power, electrical ground, and cooling medium for cooling one or more electrical energy storage modules.

It is an advantage that the common set of interfaces passes through the side wall, since the connections are then protected by the modular battery pack exterior surface.

Connections arranged on the outside of the modular battery pack would be more sensitive to damage from, e.g., external objects. Also, the exterior of the modular battery pack can be void of protrusions, which simplifies fastening the battery pack by, e.g., fastening straps and the like.

According to aspects, the common set of interfaces is configurable between serial electrical connection of battery modules and parallel electrical connection of battery modules. This means that the output voltage of the battery pack is selectable by configuration of the common set of interfaces, which is an advantage. For instance, two battery modules may be configured in series to double the output voltage, or in parallel to maintain the voltage of the individual modules.

According to aspects, the control unit comprises any of a battery management unit (BMU), one or more electrical fuses, a vehicle electrical power interface, and a vehicle cooling medium interface.

Advantageously, these interfaces between modules passes via the side walls to a control unit where the common interface is terminated. The vehicle may then interface with the battery pack via an interface to the control unit, instead of via an interface to each separate module.

According to aspects, the number of modules is selected in dependence of a length between first and second wheel axles of the vehicle.

Thus, advantageously, a physical size of the battery pack can be easily adapted to available mounting space on the vehicle, while maintaining routing and interfaces to the vehicle.

According to aspects, the number of modules is selected in dependence of an electrical energy and/or power requirement of the vehicle.

Thus, advantageously, an energy capacity of the battery pack can be easily adapted to specific requirements associated with, e.g., a vehicle type, while maintaining routing and interfaces to the vehicle.

According to aspects, at least one module comprises a charging circuit.

The charging circuit is integrated into the modular battery pack, which simplifies assembly and provides for convenient interfacing between battery modules and the chagrining module via the common set of interfaces though the side walls of the modular battery pack.

According to aspects, at least one module comprises any of; a fuel tank, a compressor unit, and an electrical junction.

Thus, advantageously, several different functions can be integrated into the same physical structure. This provides for both efficient manufacturing assembly as well as for convenient interfacing with the vehicle. Optionally, the common set of interfaces can be expanded to accommodate fuel lines and conduits for compressed air. Thereby providing for a simplified interfacing with the vehicle.

There are also disclosed herein control units, methods, computer programs, computer program products, systems, and vehicles associated with the above-mentioned advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
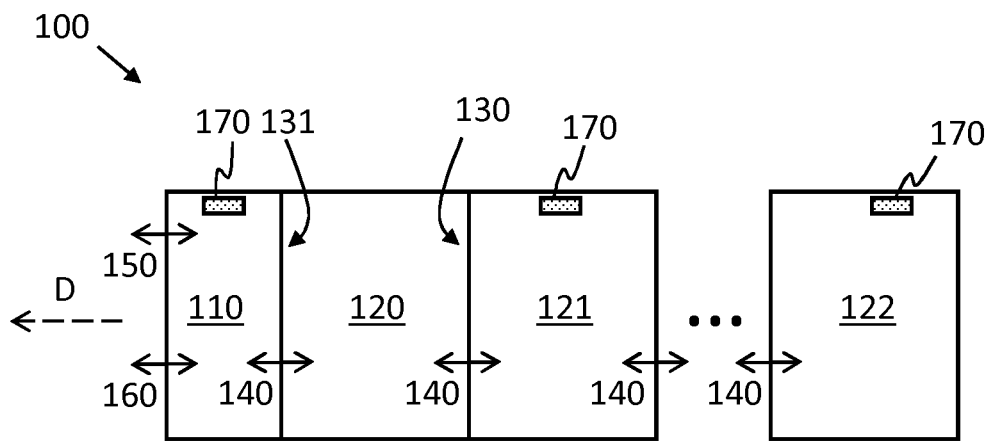
FIGS. 1-2 schematically illustrate modular battery packs.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

As mentioned above, different types of cargo transport vehicles have different requirements on power output and energy capacity of the battery system. Vehicles for cargo transport also differ in terms of, e.g., wheel base dimension, axle configuration, and load capacity. The available space for efficiently mounting battery systems is therefore different between different vehicle types.

The present disclosure presents a modular battery pack which can be adapted to different energy capacity needs and vehicle frame geometries. The proposed battery system is scalable in that it comprises modules which can be assembled as needed into a suitable battery pack having physical dimensions to fit a given vehicle frame, while providing required electrical power and energy capacity.

Notably, the disclosed battery packs comprise at least one control unit configured to interface with the vehicle, i.e., to provide power connection, electrical ground connection, and cooling connection between the battery system and the vehicle. This means that battery packs can be scaled in size and capacity without affecting design aspects of the vehicle, such as electrical routing and the like, which is an advantage.

Further benefits are obtained if additional modules are integrated with the battery pack, using the same vehicle interface for scalability, and the same attachment to the vehicle frame. Such modules may comprise, e.g., electrical charging modules, air compressors, and the like.

Herein, electrical power is the rate, per unit time, at which electrical energy is transferred by an electric circuit such as the battery pack. The SI unit of power is the Watt, one joule per second. Electrical energy is herein taken to mean the amount of power consumable over a given time period. The basic unit of electrical energy is the Joule (or Watt-second).

If the voltage is equal to the one volt, the current is equal to the one Ampere and the time is equal to the one second then the electrical energy is equal to one Joule.

FIG. 1 schematically illustrates an example modular battery pack 100 according to the present teachings. The modular battery pack 100 can be mounted onto a vehicle frame of a vehicle. In general, a vehicle frame, also known as its chassis, is the main supporting structure of a motor vehicle, to which all other components are attached. One example of a vehicle 600 built around a vehicle frame 610 will be discussed below in connection to FIG. 6. The vehicle frame may comprise rails extending between, e.g., wheel axles, to which battery packs can be mounted.

The modular battery pack 100 comprises a plurality of modules 120, 121, 122 arranged adjacent to each other. The battery pack 100 is constructed in a sandwich fashion, where each module is arranged adjacent to at least one other module. The modules in the middle of the modular battery pack, like module 121, has two adjacent modules, while the modules 120, 122 at the ends of the sandwich structure only has one adjacent module.

To provide electrical power to the vehicle 600, at least one module constitutes an electrical energy storage module. Since the number of modules determine the electrical energy storage capacity, a required capacity can be obtained by selecting a suitable number of modules, assuming the modules all have the same voltage and are connected in parallel. To obtain a higher voltage, some modules may be connected in series. Optionally, the common set of interfaces 140 can be configurable between serial electrical connection and parallel electrical connection between modules. Thus, the overall battery pack voltage can be configured simply via the common set of interfaces.

Each module comprises first and second mutually opposite side walls 130, 131 arranged to face respective side walls of adjacent modules, and to provide structural integrity of the modular battery pack. The modules 121 located in the middle of the sandwich structure have side walls facing two other modules, while the end modules 120, 122 SHOWN IN FIG. 1 have one side wall facing another module. The side walls 130, 131 are made of a structurally supporting material, such as hard plastic or metal. This structurally supporting material makes the sandwich structure robust and allows it to tolerate some mechanical stress.

Each side wall 130, 131 comprises a common set of interfaces 140 for interfacing between adjacent modules 120, 121, 122. This common set of interfaces will be discussed in more detail below. However, it is noted that the common set of interfaces are passing through the side walls and are therefore located in the battery pack interior. This means that the common set of interfaces is protected from outside interference by external objects. Also, the common set of interfaces will not interfere with, e.g., fastening means that are used to mount the battery pack to the vehicle. For instance, mounting straps can be used without risking damage to the common set of interfaces.

The modular battery pack 100 also comprises at least one control unit 110 having a side wall comprising the common set of interfaces 140. The control unit 110 also comprises a vehicle interface 150, 160 for interfacing with the vehicle.

This way there is a single point of contact with respect to the vehicle, at least if only one control unit is used in the battery pack sandwich structure. Regardless of how many modules that are comprised in the modular battery pack 100, the electrical power connections, ground connection, and potentially also cooling medium connections are interfaced with through the control unit. This simplifies vehicle design, e.g., since different vehicles with different battery capacity requirements can have the same routing solutions for electrical power.

It is noted that the battery pack may comprise more than one control unit 110.

According to aspects, the common set of interfaces 140 comprises connections for electrical power, electrical ground, and cooling medium for cooling one or more electrical energy storage modules. This way the control unit 110 is connected to each battery module via the common set of interfaces. It is appreciated that this connection is indirect, i.e., the connection may pass over intermediate modules.

According to aspects, the control unit 110 comprises any of; a battery management unit (BMU), one or more fuses, a vehicle electrical interface 150, and a vehicle cooling medium interface 160.

Figure 2:
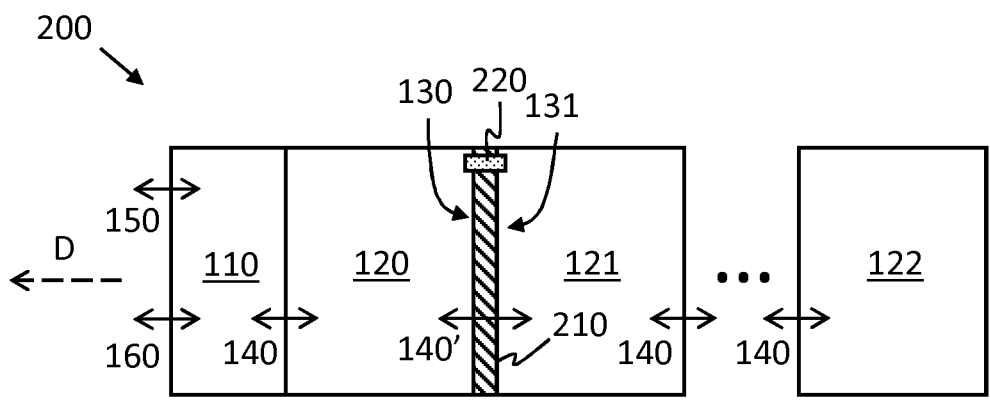

FIG. 2 schematically illustrates another example modular battery pack 200 comprising at least one intermediary bracket 210 arranged in-between side walls 130, 131 of two adjacent modules 120, 121 to provide an increased structural integrity of the modular battery pack 200. This intermediary bracket provides further reinforcement to the structural support already provided by the side walls. For instance, in case the side walls are made in hard plastic, the intermediary brackets may be made of steel or aluminum. An intermediary bracket 210 provided between two modules or between a module and the control unit 110 functions as an interface between the modules and also as structural support.

Optionally, the intermediary bracket 210 comprises a mounting element 220 for mounting the modular battery pack 200 to a vehicle frame such that the side walls 130, 131 are oriented perpendicular to a driving direction D of the vehicle. Thus, the intermediary bracket offers a robust mounting option suitable for attaching the modular battery pack to, e.g., the rails of a vehicle frame 610.

Figure 3:
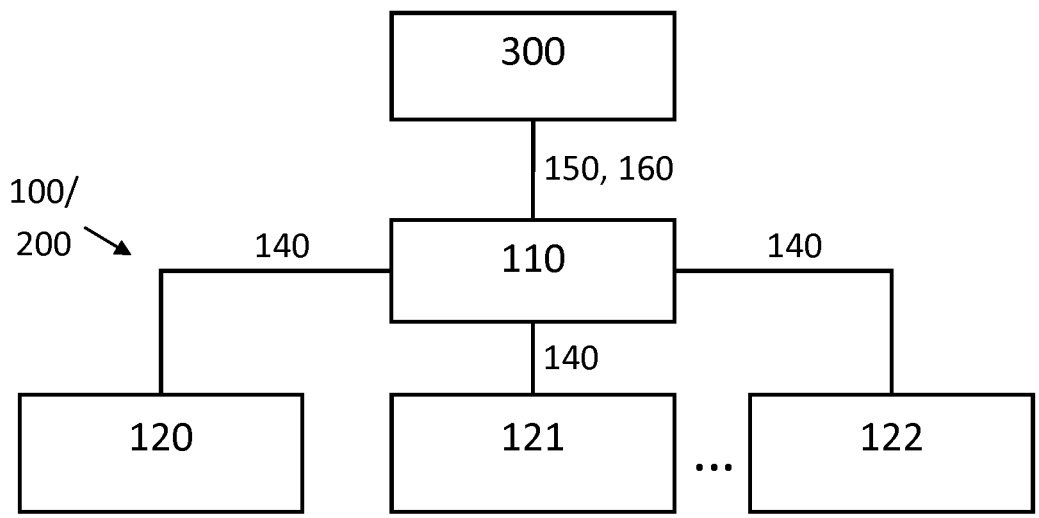
FIG. 3 shows connections in an example modular battery pack system.

FIG. 3 shows example connections in a modular battery pack 100, 200, such as those illustrated in FIGS. 1 and 2. The illustration in FIG. 3 is schematic in the sense that it shows the modules 120, 121, 122 directly connected to the energy storage system (ESS) electronic box, or control unit 110. The control unit 110 is connected to each of the modules via the common set of interfaces 140. This interface physically passes via other modules, in a bus-like fashion through the side walls 130, 131. The control unit 110 then interfaces to any external systems 300 comprised in the vehicle, such as electrical motors and other electrical power consumer subsystems.

Figure 4:
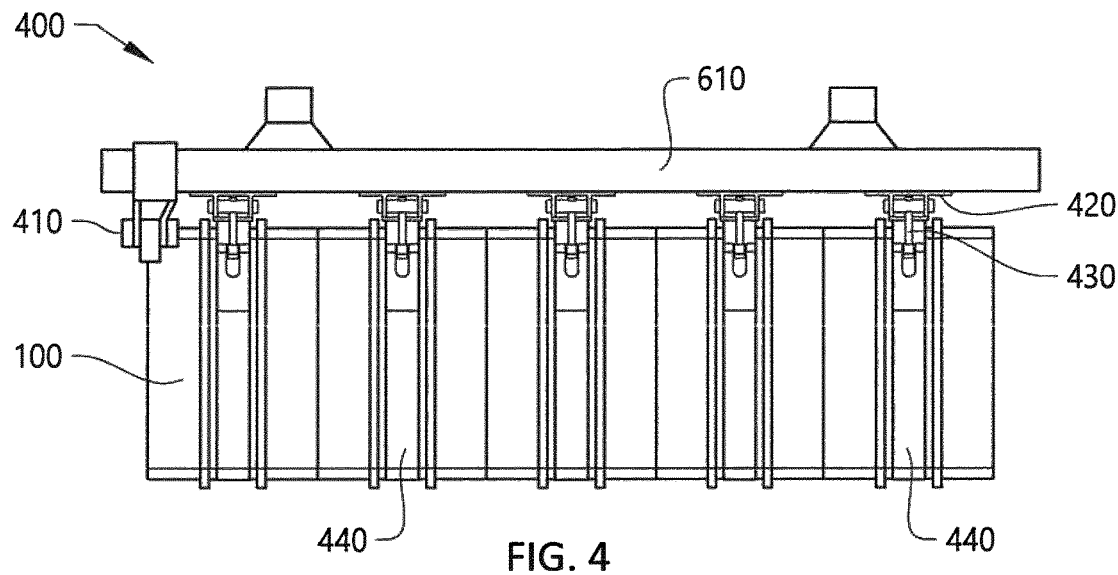
FIGS. 4-5*b* show example battery system fastening arrangements.
Figure 5A:
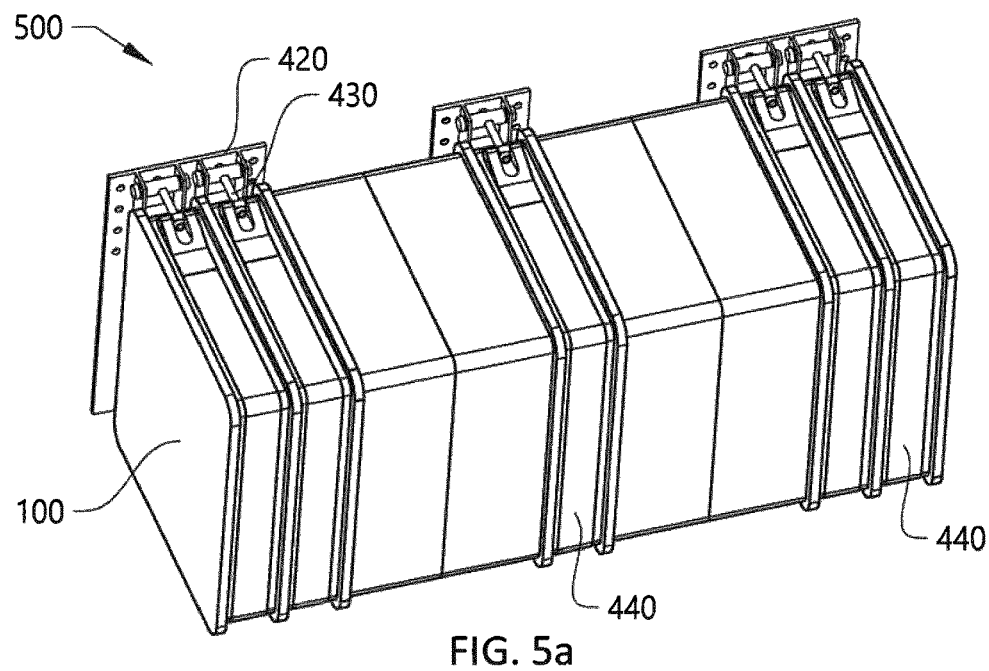
Figure 5B:
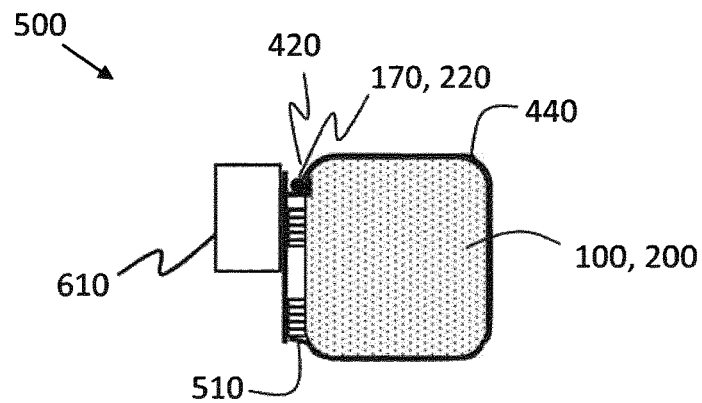

FIGS. 4, 5a and 5b show example battery system fastening arrangements 400, 500. The modular battery pack 100 is suspended from the vehicle frame 610 by one or more first brackets 420 attached to the vehicle frame 610 and held in place by one or more mounting straps 440. It is appreciated that the battery fastening arrangements 400, 500 are also applicable to the modular battery pack 200, as well as the modular battery pack 700 discussed below in connection to FIG. 7.

With reference again to FIG. 1, to attach the battery pack 100 to the vehicle, the modular battery pack 100 comprises one or more mounting elements 170 for mounting the modular battery pack 100 to a vehicle frame 610 such that the side walls 130, 131 are oriented perpendicular to a driving direction D of the vehicle.

Each first bracket 420 comprises a receiving member 430 arranged to hangably support a corresponding mounting element 170, 220 of the modular battery pack. The one or more mounting straps 440 are then used to press the modular battery pack against the one or more first brackets 420, thereby securing the assembly. Optionally, the first bracket 420 comprises resilient members 510 configured to absorb vibration and the like. When the modular battery pack is mounted in this way, the structurally supporting side walls provide a level of collision protection, which protects battery cells from mechanical stress during a collision.

Figure 6:
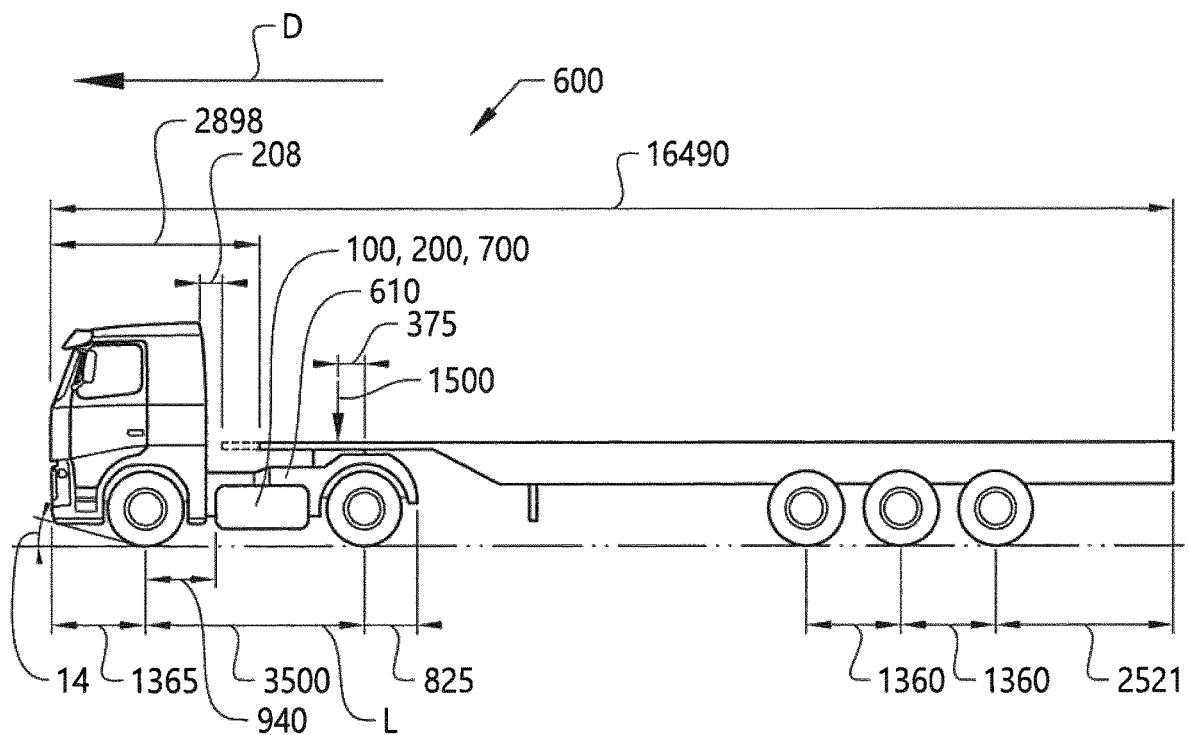
FIG. 6 schematically illustrates a vehicle with a modular battery pack.

FIG. 6 schematically illustrates a vehicle 600 with a modular battery pack 100, 200, 700 according to the discussions above and below in connection to FIG. 7.

The battery pack sandwich structure discussed above in connection to FIGS. 1 and 2 has an extension direction in parallel with the driving direction D of the vehicle. A common place to mount battery packs on cargo transport vehicles is between wheel axles on the side of the frame rail, as shown in FIG. 6. This location is advantageous in terms of vehicle stability, since it is relatively close to the ground and offers strong mechanical support.

As discussed above, according to some aspects, the number of modules n is selected in dependence of a length L between first and second wheel axles of the vehicle 600. This way, a larger vehicle having a longer distance between wheel axles may receive a larger sized battery having increased electrical storage capacity. The control unit 110, however, offers convenient interfacing to the vehicle regardless of the number of modules. The length L is schematically indicated in FIG. 6.

According to some other aspects, the number of modules n is selected in dependence of an electrical energy requirement of the vehicle 600. Consequently, vehicles may be tailored to customer requirements in terms of, e.g., electrical storage capacity and/or output power requirements. The voltage of the modular battery pack can also be adapted by configuring the common set of interfaces between serial and parallel connection.

Further embodiments of the general concept disclosed herein comprises utilizing the interface between modules to attach and integrate components other than battery modules. Relevant other modules comprise, e.g., an electrical battery charging module, a junction box, an air compressor, or even a diesel or gasoline tank for a hybrid electric vehicle. The key here is then to have a common interface between each building block of the modular battery pack, and the same frame-mounted brackets for the whole assembly. In production, the whole unit can then be installed at the same time using the same brackets 420 and mounting elements 170, 220 as discussed above.

Figure 7:
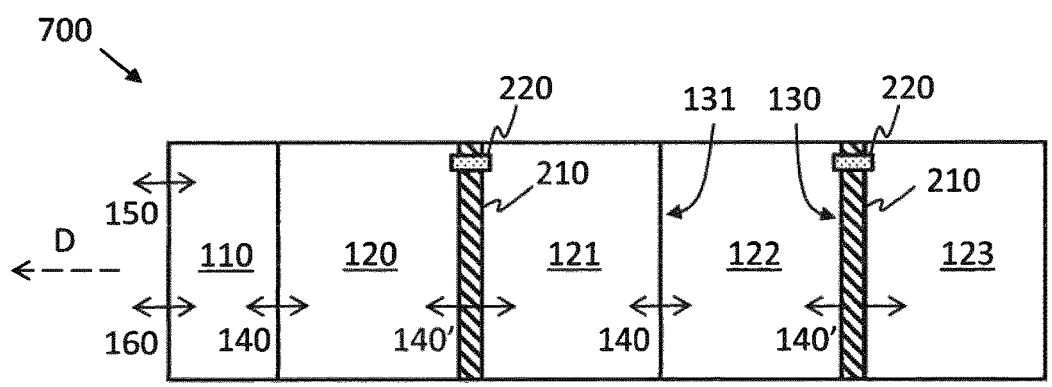
FIG. 7 schematically illustrates a modular battery pack.

FIG. 7 schematically illustrates an example modular battery pack 700 comprising a module 123 which is not a battery module, but an electrical battery charging module, a junction box, an air compressor, or a diesel or gasoline tank for a hybrid electric vehicle. Notably, the modular battery pack 700 also comprises two intermediate brackets 210 for robust mounting of the modular battery packet to a vehicle 600, and to provide increased structural strength.

To summarize, optionally, at least one module 120, 121, 122, 123 comprises a charging circuit. The charging circuit allows for connecting the modular battery pack to an energy source for charging any electrical battery modules comprised in the modular battery pack. The charging module may comprise an external connector for connecting the modular battery pack to the energy source, or it may be configured to receive charging energy via the common set of interfaces 140. Thus, according to some such aspects, the common set of interfaces 140 comprises a charging interface configured to support charging the one or more electrical energy storage modules by the charging circuit.

According to some other aspects, at least one module 120, 121, 122, 123 comprises a fuel tank. Optionally, the common set of interfaces 140 comprises a connection for providing fuel to the vehicle 600.

According to some further aspects, at least one module 120, 121, 122, 123 comprises a compressor unit. Optionally, the common set of interfaces 140 comprises a connection for providing compressed air to the vehicle 600.

According to aspects, at least one module 120, 121, 122, 123 comprises an electrical junction box.

Figure 8:
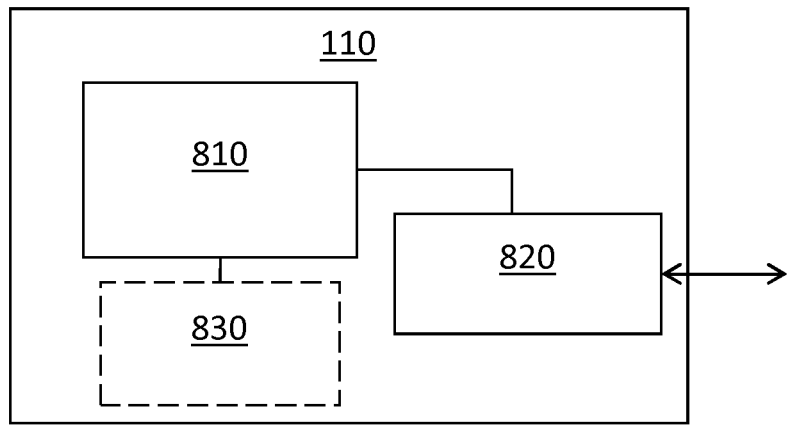
FIG. 8 schematically illustrates a control unit.

FIG. 8 schematically illustrates, in terms of a number of functional units, the components of a control unit 110 according to embodiments of the discussions herein. Processing circuitry 810 is provided using any combination of one or more of a suitable central processing unit CPU, multiprocessor, microcontroller, digital signal processor DSP, etc., capable of executing software instructions stored in a computer program product, e.g. in the form of a storage medium 830. The processing circuitry 810 may further be provided as at least one application specific integrated circuit ASIC, or field programmable gate array FPGA.

Particularly, the processing circuitry 810 is configured to cause the control unit 110 to perform a set of operations, or steps, such as the methods discussed below in connection to FIG. 9. For example, the storage medium 830 may store the set of operations, and the processing circuitry 810 may be configured to retrieve the set of operations from the storage medium 830 to cause the control unit 110 to perform the set of operations. The set of operations may be provided as a set of executable instructions. Thus, the processing circuitry 810 is thereby arranged to execute methods as herein disclosed.

The storage medium 830 may also comprise persistent storage, which, for example, can be any single one or combination of magnetic memory, optical memory, solid state memory or even remotely mounted memory.

The control unit 110 may further comprise an interface 820 for communications with at least one external device, such as the antenna array comprising the phase controllers and the mechanically rotatable base plate. As such the interface 820 may comprise one or more transmitters and receivers, comprising analogue and digital components and a suitable number of ports for wireline or wireless communication.

The processing circuitry 810 controls the general operation of the control unit 110, e.g., by sending data and control signals to the interface 820 and the storage medium 830, by receiving data and reports from the interface 820, and by retrieving data and instructions from the storage medium 830. Other components, as well as the related functionality, of the control node are omitted in order not to obscure the concepts presented herein.

Figure 9:
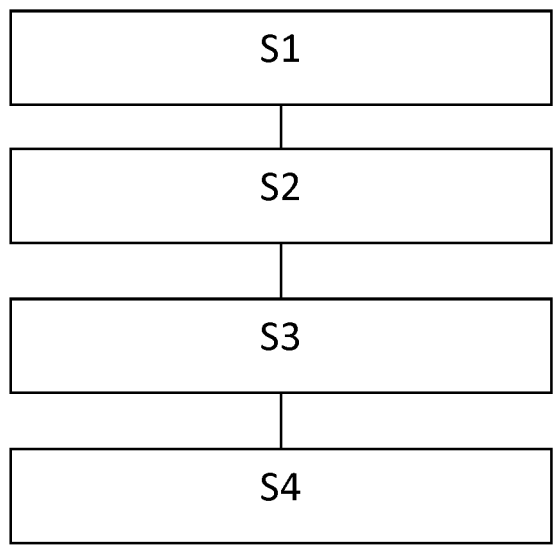
FIG. 9 is a flow chart illustrating methods.

FIG. 9 is a flow chart illustrating methods. There is illustrated a method for providing electrical energy to a vehicle 600. The method comprises;

configuring S1 a modular battery pack 100 comprising a plurality of modules 120, 121, 122, 123 arranged adjacent to each other, wherein at least one module constitutes an electrical energy storage module, each module comprising first and second opposite side walls 130, 131 arranged to face respective side walls of adjacent modules, and to provide structural integrity of the modular battery pack;

connecting S2 the modules to each other by a common set of interfaces 140 for interfacing between adjacent modules 120, 121, 122, 123, wherein the common set of interfaces is arranged in the side walls 130, 131 of the modules;

configuring S3 at least one control unit 110 having a side wall comprising the common set of interfaces 140, and also a vehicle interface 150, 160 for interfacing with the vehicle 600; and providing S4 electrical energy to the vehicle 600 via the vehicle interface 150, 160.

Figure 10:
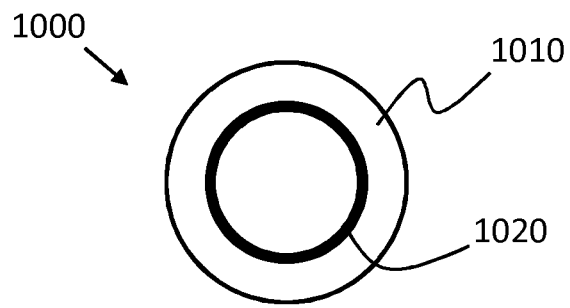
FIG. 10 shows an example computer program product.

FIG. 10 illustrates a computer readable medium 1010 carrying a computer program comprising program code means 1020 for performing the methods illustrated in FIG. 9, when said program product is run on a computer. The computer readable medium and the code means may together form a computer program product 1000.

The invention claimed is:

1. A modular battery pack for mounting to a vehicle frame of a vehicle, the modular battery pack comprising a plurality of modules arranged adjacent to each other, wherein at least one module constitutes an electrical energy storage module, characterized in that each module comprises first and second opposite side walls arranged to face respective side walls of adjacent modules, wherein the side walls comprise a structurally supporting material to provide structural integrity of the modular battery pack, each side wall comprising a common set of interfaces for interfacing between adjacent modules, the modular battery pack also comprising at least one intermediary bracket arranged in-between side walls of two adjacent modules, the modular battery pack also comprising at least one control unit having a side wall comprising the common set of interfaces wherein the control unit further comprises a vehicle interface for interfacing with the vehicle.

2. The modular battery pack according to claim 1, comprising one or more mounting elements for mounting the modular battery pack to the vehicle frame such that the side walls are oriented perpendicular to a driving direction (D) of the vehicle.

3. The modular battery pack according to claim 1, wherein the intermediary bracket comprises a mounting element for mounting the modular battery pack to the vehicle frame such that the side walls are oriented perpendicular to a driving direction (D) of the vehicle.

4. The modular battery pack according to claim 1, wherein the common set of interfaces comprises connections for electrical power, electrical ground, and cooling medium for cooling one or more electrical energy storage modules.

5. The modular battery pack according to claim 1, wherein the control unit comprises any of a battery management unit, BMU, one or more electrical fuses, a vehicle electrical power interface and a vehicle cooling medium interface.

6. The modular battery pack according to claim 1, wherein the number of modules (n) is selected in dependence of a length (L) between first and second wheel axles of the vehicle.

7. The modular battery pack according to claim 1, wherein the number of modules (n) is selected in dependence of an electrical energy and/or power requirement of the vehicle.

8. The modular battery pack according to claim 1, wherein the common set of interfaces is configurable between serial electrical connection of battery modules and parallel electrical connection of battery modules.

9. The modular battery pack according to claim 1, wherein at least one module comprises a charging circuit.

10. The modular battery pack according to claim 9, wherein the common set of interfaces comprises a charging interface configured to support charging the one or more electrical energy storage modules by the charging circuit.

11. The modular battery pack according to claim 1, wherein at least one module comprises a fuel tank.

12. The modular battery pack according to claim 11, wherein the common set of interfaces comprises a connection for providing fuel to the vehicle.

13. The modular battery pack according to claim 1, wherein at least one module comprises a compressor unit.

14. The modular battery pack according to claim 13, wherein the common set of interfaces comprises a connection for providing compressed air to the vehicle.

15. The modular battery pack according to claim 1, wherein at least one module comprises an electrical junction box.

16. A vehicle comprising the modular battery pack according to claim 1.

17. A method for providing electrical energy to a vehicle, the method comprising configuring (S1) a modular battery pack comprising a plurality of modules arranged adjacent to each other, wherein at least one module constitutes an electrical energy storage module, each module comprising first and second opposite side walls arranged to face respective side walls of adjacent modules, and wherein the side walls comprise a structurally supporting material to provide structural integrity of the modular battery pack, and wherein the modular battery pack also comprises at least one intermediary bracket arranged in-between side walls of two adjacent modules to provide an increased structural integrity of the modular battery pack, connecting (S2) the modules to each other by a common set of interfaces for interfacing between adjacent modules, wherein the common set of interfaces is arranged in the side walls of the modules, configuring (S3) at least one control unit having a side wall comprising the common set of interfaces, and also a vehicle interface for interfacing with the vehicle, and providing (S4) electrical energy to the vehicle via the vehicle interface.

* * * * *